United States Patent [19]
Klein

[11] Patent Number: 5,988,729
[45] Date of Patent: Nov. 23, 1999

[54] ROOF CONSTRUCTION FOR AN OPEN PASSENGER CAR

[75] Inventor: Berthold Klein, Rutesheim, Germany

[73] Assignee: DaimlerChrysler AG, Stuttgart, Germany

[21] Appl. No.: 08/938,312

[22] Filed: Sep. 26, 1997

[30] Foreign Application Priority Data

Sep. 26, 1996 [DE] Germany ............... 196 39 567

[51] Int. Cl.$^6$ .................................................. B60J 7/08
[52] U.S. Cl. ............... 296/107.15; 296/108; 296/107.07
[58] Field of Search ............... 296/107.01, 108, 296/107.09, 107.15, 107.17, 210, 107.07, 146.14

[56] References Cited

U.S. PATENT DOCUMENTS

| | | |
|---|---|---|
| 2,836,457 | 5/1958 | Berman et al. . |
| 4,784,428 | 11/1988 | Moy et al. . |
| 5,520,432 | 5/1996 | Gmeiner et al. ............ 296/108 X |

FOREIGN PATENT DOCUMENTS

| | | |
|---|---|---|
| 16 95 169 | 3/1955 | Germany . |
| 1 179 125 | 10/1964 | Germany . |
| 3416285A1 | 10/1984 | Germany . |
| 4445920A1 | 7/1996 | Germany . |
| 6187175 | 6/1961 | Japan . |
| 6166380 | 6/1994 | Japan . |
| 6191285 | 7/1994 | Japan . |
| 8230481 | 9/1996 | Japan . |
| 1377626 | 12/1974 | United Kingdom ............... 296/108 |
| 2240519A | 8/1991 | United Kingdom . |

OTHER PUBLICATIONS

Search ReportJan. 21, 1998 Europe.
Office Action Sep. 25, 1998 Japan.

*Primary Examiner*—D. Glenn Dayoan
*Assistant Examiner*—Jason Morrow
*Attorney, Agent, or Firm*—Evenson, McKeown, Edwards, & Lenahan PLLC

[57] ABSTRACT

A two-part hard top construction for an open passenger car can be deposited in a folded-together manner in a receiving space in a rear area of the vehicle body. A rearward part is constructed as a stable, one-piece component of a transparent material which forms two C-column parts laterally flanking the rear widow, and a forward roof part is constructed as a folding top unit which is supported on the rearward part and, in the unfolded condition, can be fixed on a windshield frame of the vehicle body.

8 Claims, 1 Drawing Sheet

ROOF CONSTRUCTION FOR AN OPEN PASSENGER CAR

BACKGROUND AND SUMMARY OF THE INVENTION

This application claims the priority of German application 196 39 567.4-21 filed in Germany on Sep. 26, 1996.

The invention relates to a roof construction for an open passenger car having a rearward part which is swivellably disposed on the vehicle body and has an integrated rear window as well as having a roof part which is linked to the rearward part and which, by way of joint movement kinematics can be lowered together with the rearward part into a receiving space of the vehicle body. The rearward part is designed as a dimensionally stable component which forms two C-column parts which laterally flank the rear window, and the roof part is constructed as a folding top unit which is supported on the rearward part and which, in the folded-open conditions can be fixed to a windshield frame of the vehicle body.

A roof construction of this type for an open passenger car is known from German Patent Document DE-GM 16 95 169. In this case, a stiff sheet metal construction, which is swivellably fastened on the motor vehicle body, when the folding top is closed, forms a rearward part of the motor vehicle interior as well as a receiving device for the rear window of the motor vehicle. Furthermore, a roof part is provided which is designed as a fabric top and which is fastened on the stiff rearward part and is tensioned in its width by means of several transversely arranged supporting hoops. When the top is closed, the rearward part is swivelled out of the vehicle body and is erected; the roof part is unfolded and is tensioned over the vehicle occupant compartment in that it is fixed in the area of the windshield.

A two-part roof construction for an open passenger car is known on the basis of the Mercedes SLK-Roadster. The roof construction has two hard shells which are swivellably connected with one another and of which one is designed as a roof part and the other is designed as a rearward part. The roof part and the rearward part are painted in the color of the vehicle. A rear window is integrated in the rearward part. The two parts of the roof construction can be lowered into a receiving space in the rearward structure of the vehicle in a folded condition.

A folding top for an open passenger car is also known (German Patent Document DE-AS 1 179 125) which has a support construction covered with a top material. In the rearward area of the folding top, a rear window, which is held in a stable frame, is disposed by means of a lever linkage on the support construction. For the lowering of the folding top into its position exposing the passenger compartment, the rear window can be displaced toward the lateral support rods of the support construction and can be lowered together with the support construction. By holding the rear window in a stable frame which is disposed by means of a separate lever linkage on the support construction, it is possible to design the rear window with a relatively large surface. However, the devices for holding the frame carrying the rear window have a relatively high-expenditure design.

It is an object of the invention to provide a roof construction of the initially mentioned type which, also in the closed condition, ensures a bright passenger compartment.

According to the invention, this object is achieved in that the rearward part, including the C-column parts laterally flanking the rear window, are at least essentially made of a transparent material. Because of the solution according to the invention, the passenger compartment will be very bright even in the closed condition of the roof construction. In comparison to known top constructions, the driver's view toward the rear is considerably improved since the dead areas at the level of the C-column sections are eliminated which in the case of known fabric top constructions could cause considerable visual defects. The rearward part may also have supporting frame elements made of non-transparent, dimensionally stable materials which, however, in comparison to the large transparent viewing surfaces of the rearward part are arranged such that they do not impair the viewing area toward the rear. In the case of the solution according to the invention, the rearward part carries out the supporting and carrying function for the roof part, specifically the folding top unit. Because of the design of the folding top unit as a dimensionally stable component, the construction of the folding top unit can be simplified in comparison to known full-top units. Essentially, the care for the dimensionally stable component is easier and the component is sturdier than a full-top unit which extends downward also over the rearward area of the roof construction. The design of the roof part as a folding top unit ensures that, in the open condition of the passenger compartment, the roof part can be lowered relatively compactly together with the rearward part and thus, in comparison to a two-part hard top construction, requires a considerably reduced receiving space in the rearward structure of the passenger car. The joint movement kinematics for the folding top unit and the rearward-side component representing the rear window ensure a simple opening and closing of the roof construction at low expenditures and minimal control-type measures. It is particularly characteristic of the solution according to the invention that the rearward part is almost completely made of a transparent material.

As a further development of the invention, the rearward part is provided with joined frame parts for the linking and bearing of the folding top unit as well as for the fastening of a top covering of the folding top unit. The frame parts are advantageously fastened on the rearward part in a detachable manner so that, in the mounted condition, they form a one-piece construction unit together with the rearward part.

Other objects, advantages and novel features of the present invention will become apparent from the following detailed description of the invention when considered in conjunction with the accompanying drawings.

DETAILED DESCRIPTION OF THE DRAWINGS

Figure 1:
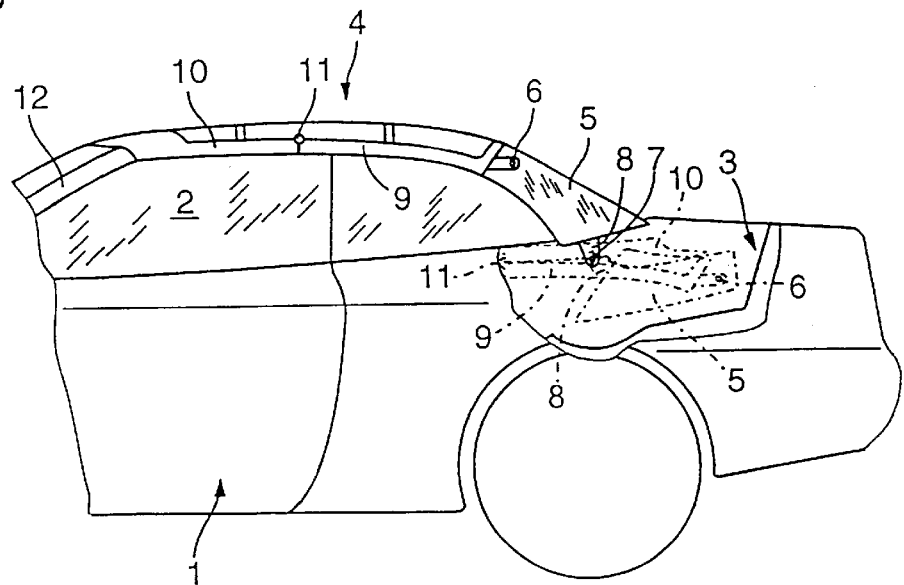
FIG. 1 is a schematic lateral view of an open passenger car with an embodiment of a roof construction according to the invention.
Figure 2:
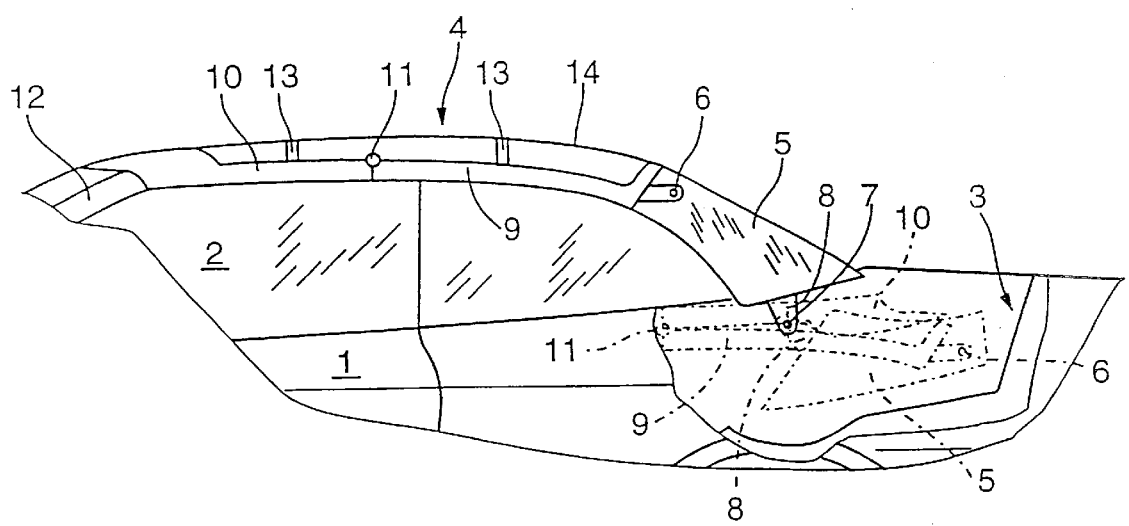
FIG. 2 is a representation which is enlarged in comparison to FIG. 1 of an area of the passenger car according to FIG. 1 at the level of the roof construction.

An open passenger car 1 according to FIG. 1 and 2 represents a four-seat convertible. A passenger compartment 2 of the passenger car 1 is protected against rollovers, on the one hand, by a stable windshield frame 12 and, on the other hand, by a rollover guard in the rear area of the passenger compartment 2 which is not shown and which can be erected abruptly in a danger situation. For closing the passenger compartment 2, the open passenger car 1 has a roof construction 4, 5 which is composed of a roof part 4 and of a rearward part 5. In a manner described in detail in the following, the rearward part 5 is constructed as a hard top part, but the roof part 4 is constructed as a soft top part. The rearward part 5 is manufactured as a one-piece rigid component from a transparent material; in the case of the illustrated embodiment, the rearward part 5 is of multilayer glass. In an embodiment of the invention which is not shown, the rearward part 5 is made of a transparent and highly stable plastic material, particularly of a composite material. In additional embodiments of the invention, which are not shown, the rearward part is not completely manufactured of a transparent material but has carrying frame elements made of metallic or other dimensionally stable, non-transparent materials. The rearward part 5 extends along the whole width of the roof construction 4, 5 and, on the back side, has the actual rear window. The rear window is curved or bent toward the sides and, on each side, forms one C-column support respectively so that, on the whole, a shell-type structural shape is obtained for the rearward part 5. In the area of the C-column supports serving as the C-column parts, the rearward part 5 is provided on its bottom side with one stable support block 8 respectively, in which case the two support blocks 8 swivellably dispose the rearward part 5 about a horizontal swivelling axis 7, on each side of the rearward part 5, extending transversely to the longitudinal direction of the vehicle in lateral vehicle body parts of the vehicle body.

For receiving the roof construction 4, 5, a box-shaped receiving space 3, which can be closed by a lid, is provided in a rear section of the vehicle body of the passenger car 1.

In an upper edge area of the rearward part 5, bearing points 6 for the swivellable linking of the roof part 4 are provided. The roof part 4 is designed as a folding top unit and has a foldable carrying bow construction 9,10 which, by means of fabric holding bows and hoops which are not shown in detail, unfold and fold together the folding top unit. The carrying bow construction 9, 10 of the folding top unit 4 has two supports 9 which form a rear part of the roof frame and which, on the rear side, are disposed in the bearing points 6 of the rearward part 5. On their forward front ends, the supports 9 are connected by means of hinge points 11 with a carrying bow 10 which adjoins the windshield frame 12 and extends along the whole width of the windshield frame 12.

The rearward part 5 can be swivelled between a closed position illustrated in FIGS. 1 and 2 and an open position also illustrated in FIGS. 1 and 2 in dot-dash lines. In the open position, the rearward part 5 is lowered in the receiving compartment 3. In the closed position, the rearward part 5 is used as a stable support for unfolding the folding top unit 4 which is fixed by means of corresponding locks in its closed position on the windshield frame 12. In the open position (FIGS. 1 and 2 in dot-dash lines), the folding top unit 4 is folded together, in which case it can be deposited in the rearward part 5 between the C-column supports of the rearward part 5 which project upward in the manner of a shell. Since the folding top unit 4 can be folded together about the axis of the hinge points 11 to approximately half its length, the folded-together folding top unit 4 in its length projects only slightly beyond the rearward part 5.

In the lowered condition, the rearward part 5 forms a receiving shell for the folding top unit 4 since it is swivelled into its lowered position such that the lateral C-column supports project upwards. The carrying bow construction 9, 10 as well as the rearward part 5 are assigned to one another such that, by means of joint movement kinematics, they can be folded together into the lowered open position of the passenger compartment 2 and analogously can also be changed back into the closed position spanning the passenger compartment 2. The carrying bow construction 9, 10 tensions the fabric covering 14 by means of a knuckle joint principle, in which case it is supported on the rearward part 5 which is positioned in a stable manner. Naturally, the tensioning of the fabric covering by means of the knuckle joint principle is only a special development according to the invention. However, the carrying bow construction may also have different tensioning arrangements or be designed such that no special tensioning arrangement is required.

The roof construction can be handled like a folding top which is known per se. After the unlocking of the folding top unit 4 in the area of the windshield frame 12, the carrying hoop 10 of the folding top unit 4 is folded toward the rear in a simple manner. After the opening of the folding top compartment lid, the whole roof construction is deposited in the receiving space 3, in which case it is folded together in the illustrated manner. If a corresponding lid for the receiving space 3 is not hindered in its mobility by the rearward part 5, this lid can be opened up independently of the reached position of the roof construction 4, 5 and, after the unlocking in the area of the windshield frame 12, the roof construction 4, 5 can be lowered into the receiving space 3. The opening and new closing of the roof construction 4, 5 can take place either by a manual operation or by corresponding drives.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Roof construction for an open passenger car comprising:

a rearward part which, in use, is swivellably disposed on a vehicle body and has an integrated rear window, and a roof part which can be lowered together with the rearward part into a receiving space of the vehicle body, the rearward part being a dimensionally stable component which forms two C-column parts which laterally flank a vehicle rear window, the roof part including rear supports and a carrying element hinged to said rear supports and being constructed as a folding top unit with said rear supports linked to the rearward part, wherein the carrying element, in a folded-open condition, can be fixed to a windshield frame of the vehicle body, and wherein the rearward part, including the C-column parts laterally flanking the rear window, is at least essentially constructed of a transparent material.

2. Roof construction according to claim 1, wherein the roof part is a folding top unit and further comprising bearing points which link the rearward part with the folding top unit.

3. A passenger convertible roof construction assembly comprising:

a rearward part which in use is swivellably disposed on a vehicle body, said rearward part having an integrated rear window and being configured as a dimensionally stable component which forms respective C-column parts at lateral sides of the rear window and the vehicle body when in a closed top position, and a roof part including rear supports and a carrying element hinged to said rear supports, said carrying element being configured to be fixed to a windshield frame of the vehicle body when in the closed top position, said rearward part, said rear supports and said carrying element being foldably stored in a vehicle rear top storage space when in a vehicle open top position, wherein the rearward part including the C-column parts laterally flanking the rear window is constructed of a transparent material.

4. An assembly according to claim 3, wherein said transparent material includes plural glass layers.

5. An assembly according to claim 3, wherein said transparent material is a plastic material.

6. An assembly according to claim 3, wherein the roof part is a folding top unit and further comprising bearing points which link the rearward part with the folding top unit.

7. An assembly according to claim 4, wherein the roof part is a folding top unit and further comprising bearing points which link the rearward part with the folding top unit.

8. An assembly according to claim 5, wherein the roof part is a folding too unit and further comprising bearing points which link the rearward part with the folding top unit.

* * * * *